United States Patent
Peng et al.

(10) Patent No.: US 8,116,835 B2
(45) Date of Patent: Feb. 14, 2012

(54) ELECTRONIC DEVICE AND SLIDING MECHANISM THEREOF

(75) Inventors: Chia-Hsiung Peng, Taoyuan County (TW); I-Cheng Chuang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 307 days.

(21) Appl. No.: 12/633,846

(22) Filed: Dec. 9, 2009

(65) Prior Publication Data

US 2010/0323769 A1 Dec. 23, 2010

(30) Foreign Application Priority Data

Jun. 18, 2009 (TW) .............................. 98120380 A

(51) Int. Cl.
*H04M 1/00* (2006.01)
(52) U.S. Cl. ................ 455/575.4; 455/575.1; 455/550.1
(58) Field of Classification Search ............... 455/575.4, 455/575.1, 550.1, 90.2, 90.3
See application file for complete search history.

(56) References Cited

U.S. PATENT DOCUMENTS

| | | | |
|---|---|---|---|
| 6,816,363 B2 | 11/2004 | Yamamoto | |
| 7,376,449 B2 * | 5/2008 | Mizuta et al. | 455/575.3 |
| 7,599,723 B2 * | 10/2009 | Lee et al. | 455/575.4 |
| 7,860,540 B2 * | 12/2010 | Mizuta et al. | 455/575.4 |
| 7,869,844 B2 * | 1/2011 | Lee et al. | 455/575.4 |
| 8,050,727 B2 * | 11/2011 | Li et al. | 455/575.4 |
| 2006/0114646 A1 | 6/2006 | Koibuchi et al. | |
| 2008/0298025 A1 * | 12/2008 | Chang et al. | 361/727 |
| 2009/0147451 A1 * | 6/2009 | Yeh | 361/679.01 |
| 2010/0195296 A1 | 8/2010 | Nishiwaki | |

FOREIGN PATENT DOCUMENTS

WO  WO 2009/041610 A1  4/2009

* cited by examiner

*Primary Examiner* — Sonny Trinh
(74) *Attorney, Agent, or Firm* — Birch, Stewart, Kolasch & Birch, LLP

(57) ABSTRACT

A sliding mechanism is provided, including a first member, a second member, a slider, a wire, and a flexible printed circuit (FPC). The first member and the slider are movable with respect to the second member. The wire connects the first member with the slider. The FPC is extended through a first opening of the slider and a second opening of the second member. When the first member slides with respect to the second member along a first direction, the slider and the FPC are dragged by the wire along a second direction opposite to the first direction.

18 Claims, 5 Drawing Sheets

ELECTRONIC DEVICE AND SLIDING MECHANISM THEREOF

CROSS REFERENCE TO RELATED APPLICATIONS

This Application claims priority of Taiwan Patent Application No. 098120380, filed on Jun. 18, 2009, the entirety of which is incorporated by reference herein.

BACKGROUND OF THE INVENTION

1. Field of the Invention

The application relates in general to an electronic device and in particular to an electronic device having a sliding mechanism.

2. Description of the Related Art

Referring to FIG. 1, a conventional sliding-type mobile phone includes a first body 100 and a second body 200 reciprocally movable with respect to each other (as the arrows indicate in FIG. 1), wherein the first body 100 includes a keypad 300, and the second body 200 includes a screen 400.

The first body 100 and the second body 200 are electrically connected by a flexible printed circuit board (not shown). However, when sliding between the first body 100 and the second body 200, buckling deformation and damage of the flexible printed circuit board may occur, thus adversely leading to failure of mobile phone functions.

BRIEF SUMMARY OF INVENTION

The application provides a sliding mechanism including a first member, a second member, a slider, a wire, and a flexible printed circuit (FPC). The first member and the slider are movable with respect to the second member. The wire connects the first member with the slider. The FPC is extended through a first opening of the slider and a second opening of the second member. When the first member slides with respect to the second member along a first direction, the slider and the FPC are dragged by the wire along a second direction opposite to the first direction.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
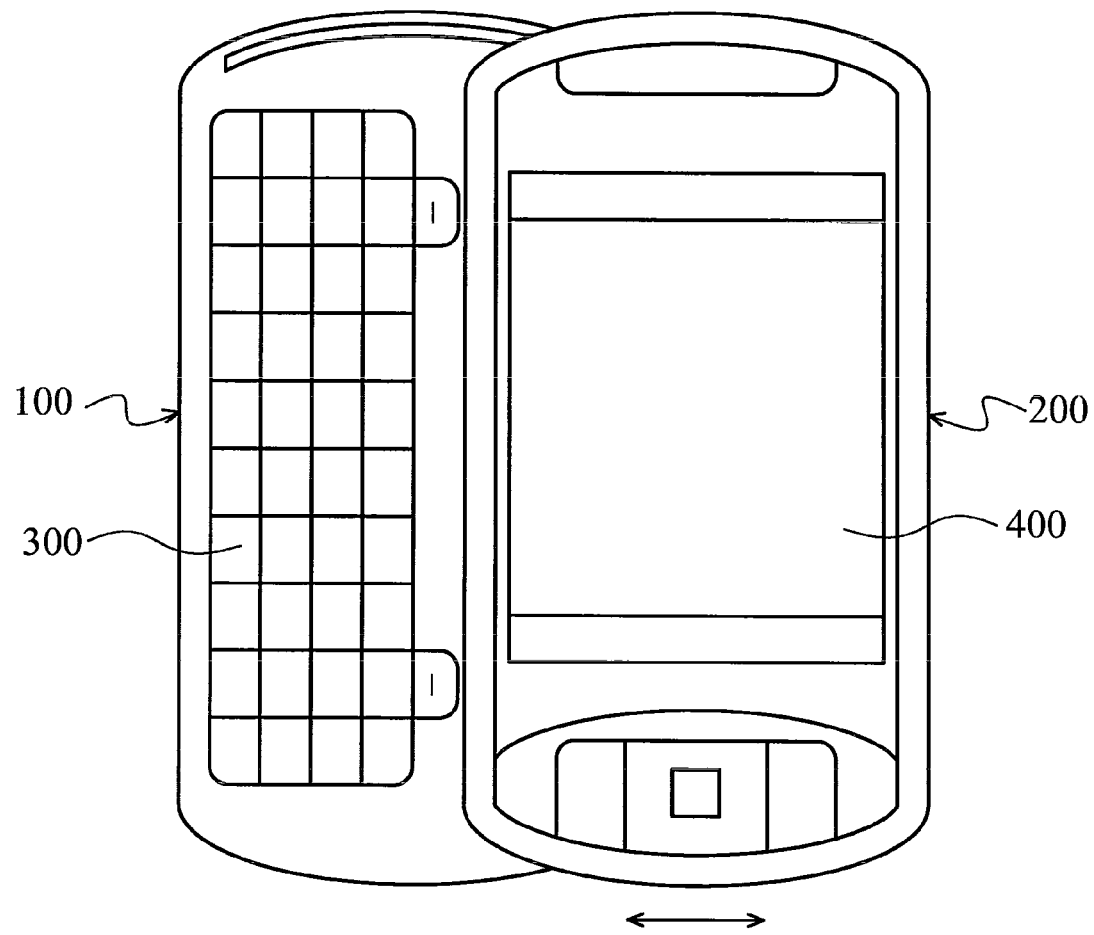
FIG. 1 is a perspective diagram of a conventional sliding-type mobile phone.
Figure 2A:
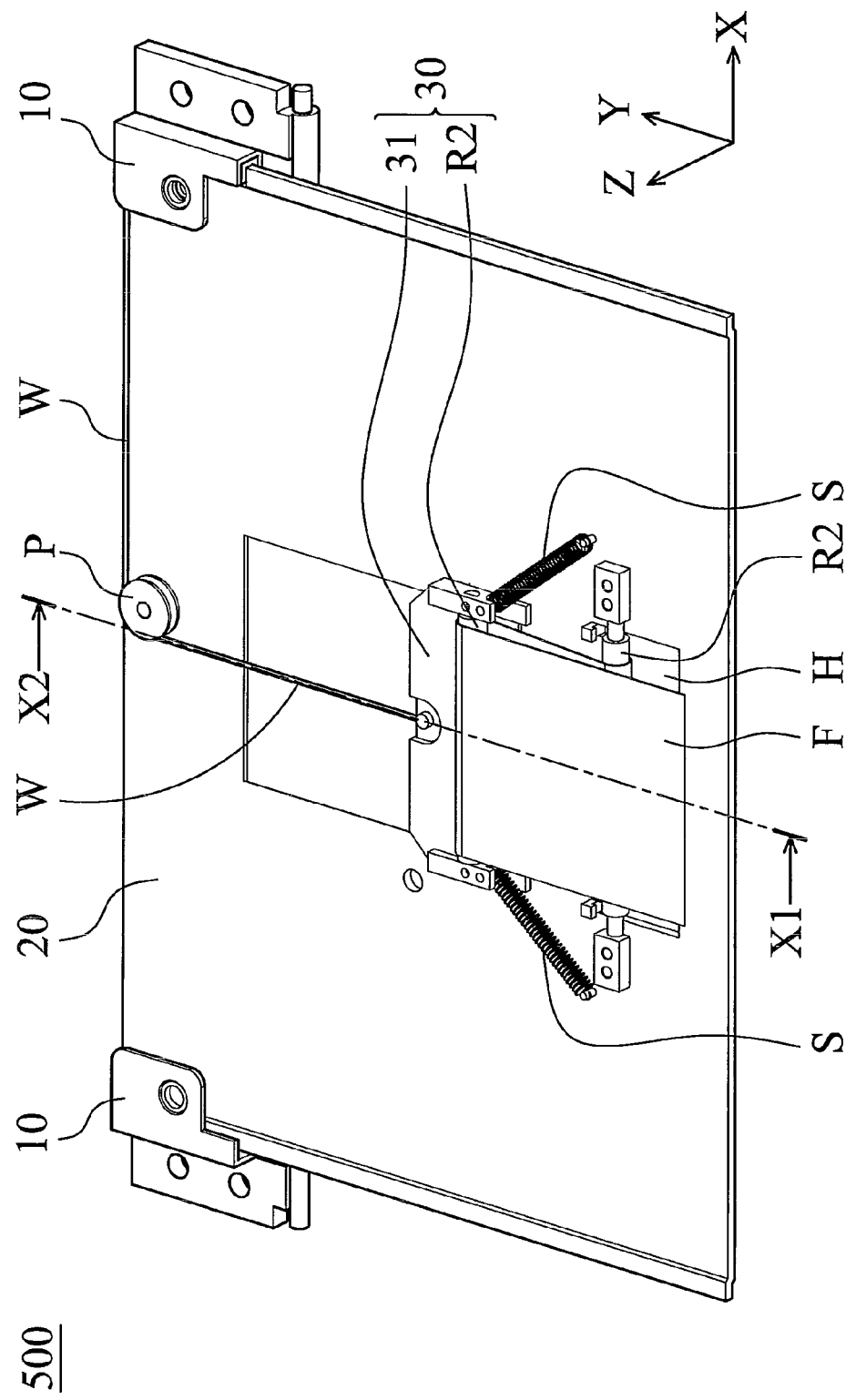
FIG. 2A is a sliding mechanism when in an open state in accordance with an embodiment of the invention.
Figure 3A:
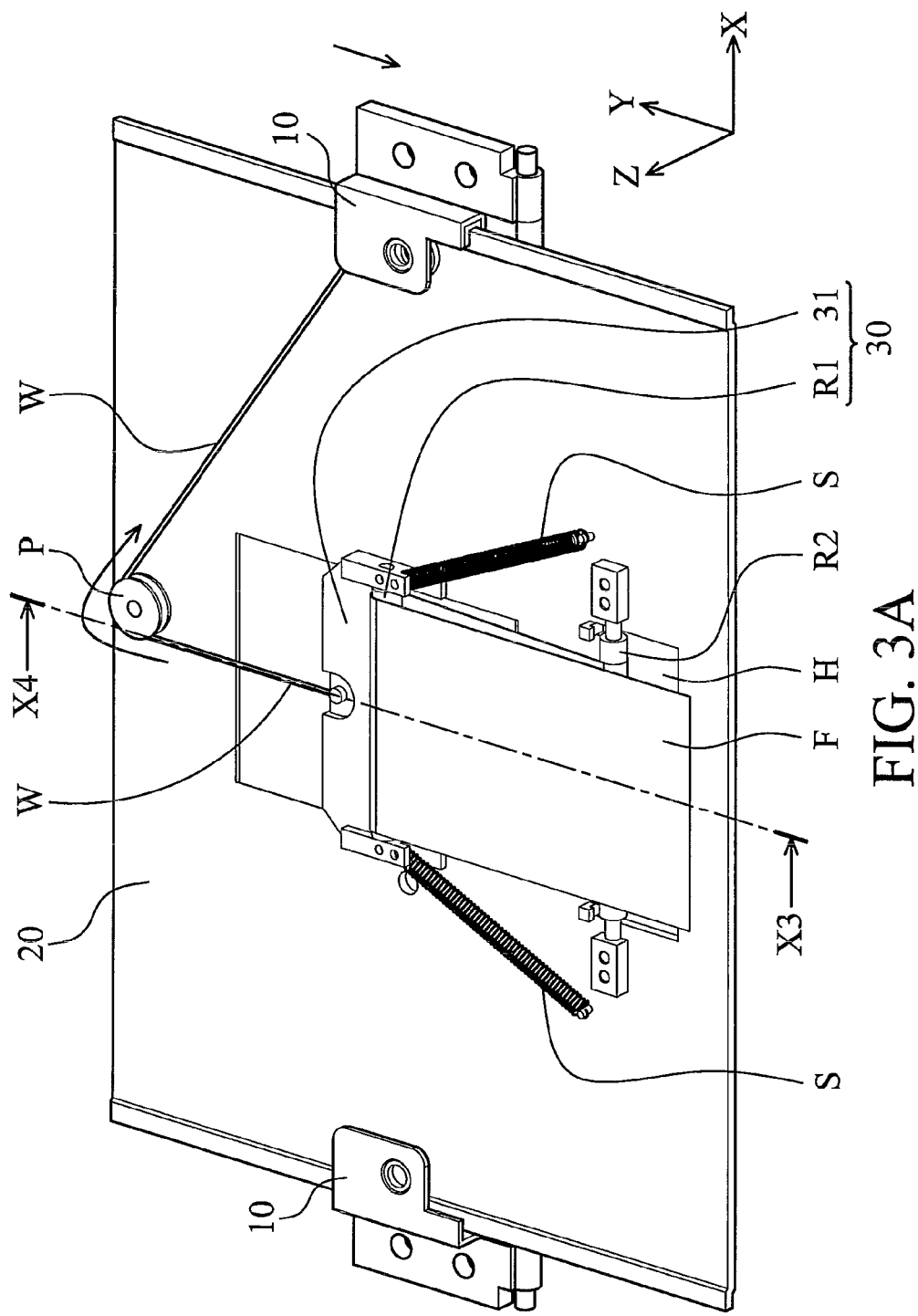
FIG. 3A is a sliding mechanism when in a closed state in accordance with an embodiment of the invention.

FIG. 2A depicts an embodiment of a sliding mechanism 500 when in an open state, and FIG. 3A depicts the sliding mechanism 500 when in a closed state. The sliding mechanism 500 of FIGS. 2A and 3A can be disposed in an electronic device for connecting the first body 100 to the second body 200 as shown in FIG. 1, so as to prevent buckling deformation and damage of a flexible printed circuit F. In this embodiment, the electronic device may be a mobile phone, PDA, Ultra-Mobile PC (UMPC), or tablet PC. When the sliding mechanism 500 is in the open state (FIG. 2A), the first body 100 and the second body 200 overlap only in a small area thereof, such as shown in FIG. 1. When the sliding mechanism 500 is switched to the closed state (FIG. 3A), the first body 100 and the second body 200 overlap completely.

Referring to FIG. 2A, the sliding mechanism 500 includes a first member 10, a second member 20, a slider 30, a wire W, at least an elastic element S, and a flexible printed circuit F. In this embodiment, the first member 10 is fixed to the first body 100, and the second member is fixed to the second body 200. When the first body 100 slides with respect to the second body 200, the first member 10 moves with respect to the second member 20 along the Y axis.

In FIG. 2A, both ends of the wire W are respectively bonded to the first member 10 and the slider 30, and a pulley P is disposed on the second member 20 with the wire W extended therethrough. As the arrows shown in FIG. 3A, when the first member 10 slides with respect to the second member 20 along the −Y direction, the wire W is pulled by the first member 10 and moved around the pulley P.

Figure 2B:
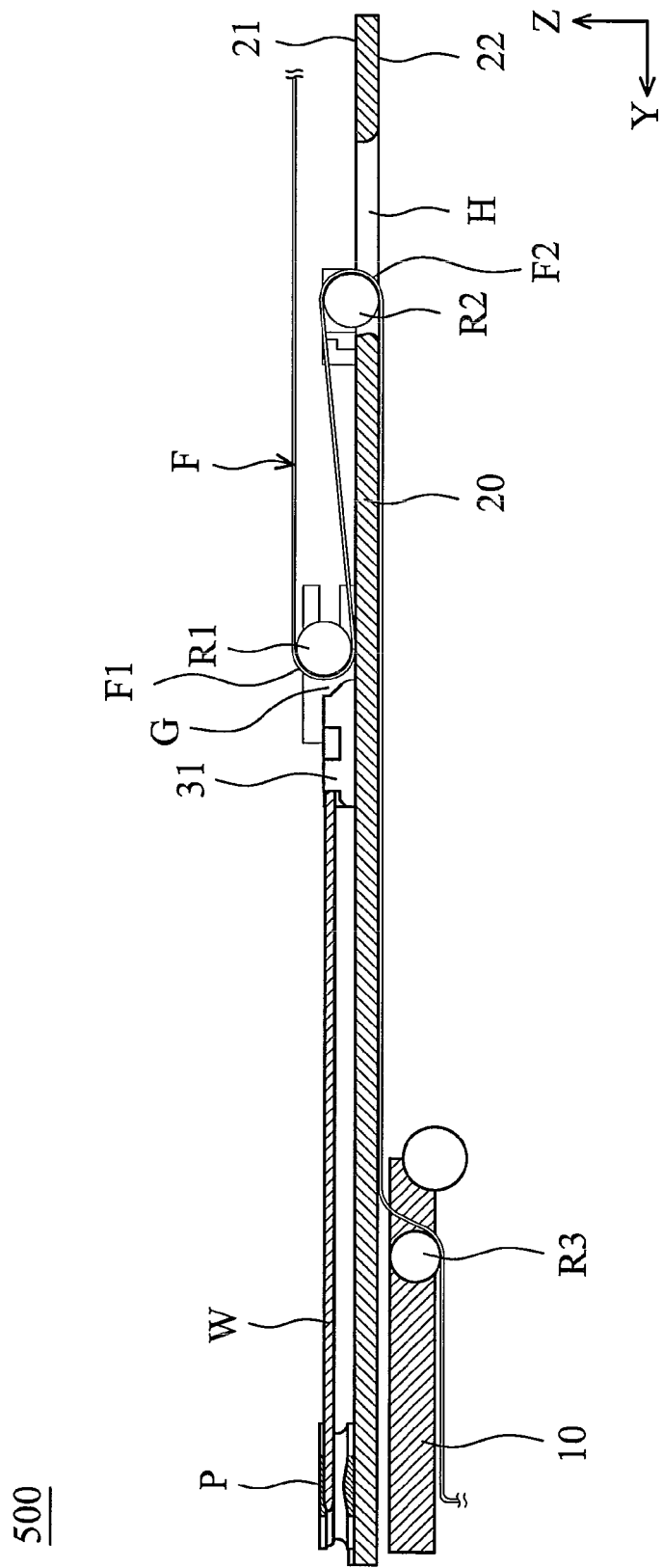
FIG. 2B is a sectional view along X1-X2 in FIG. 2A.
Figure 3B:
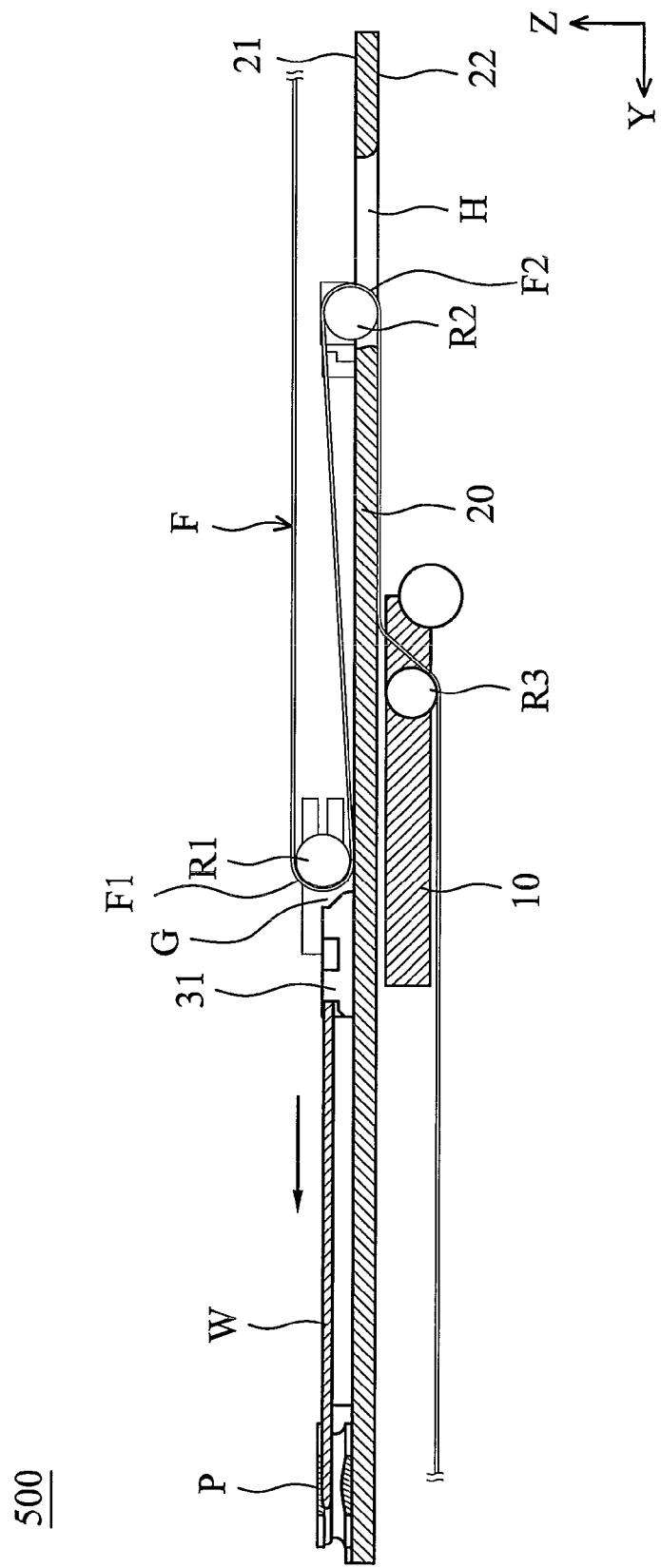
FIG. 3B is a sectional view along X3-X4 in FIG. 3A.

As depicted in FIGS. 2B and 3B, the slider 30 is disposed on a first side 21 of the second member 20, and the first member 10 is disposed on a second side 22 of the second member 20, opposite to the first side 21. In this embodiment, a first opening G is formed between a main body 31 and a first rod R1 of the slider 31. The flexible circuit board F is extended from the first side 21 of second member 20, through the first opening G and a second opening H of the second member 20, to the second side 22 for electrical connection between the first body 100 and the second body 200. Here, a first bending portion F1 and a second bending portion F2 of the flexible circuit board F are respectively formed on the first rod R1 of the slider 30 and a second rod R2 of the second member 20, such that the flexible circuit board F has an S-shaped cross-section.

Referring in FIGS. 2A and 2B, when the sliding mechanism 500 is in the open state, the first member 10 is in a first position with respect to the second member 20. The elastic element S can provide an elastic force to the slide 30 so that the wire W is tensioned, thus forming the S-shaped cross-section of the flexible circuit board F, as shown in FIG. 2B.

Referring in FIGS. 3A and 3B, when the sliding mechanism 500 switches from the open state to the closed state, the first member 10 slides with respect to the second member 20 along the −Y direction (first direction) from the first position to a second position. During sliding of the first member 10 along the −Y direction, the wire W is further tensioned, and the slider 30 is dragged by the wire W along the Y direction (second direction). Specifically, the flexible circuit board F is impelled by the first rod R1 along the Y direction, thus preventing buckling and damage thereof when the first member 10 slides along the −Y direction.

To return the first member 10 from the second position to the first position, the elastic element S can provide an elastic force to move the slider 30 along the −Y direction, such that the flexible circuit board F returns to the state as shown in FIGS. 2A and 2B. In this embodiment, the sliding mechanism 500 further comprises a third rod R3 disposed on the first member 10, as shown in FIGS. 2B and 3B. When the first member 10 moves with respect to the second member 20, the flexible circuit board F slides through the third rod R3. In some embodiments, the sliding mechanism 500 may comprise a plurality of elastic elements S, such as two extension springs respectively disposed on opposite sides of the slider 30 to facilitate sliding stability.

The application provides a sliding mechanism connecting a first body and a second body of an electronic device, wherein the first body and the second body are electrically connected by a flexible circuit board. The sliding mechanism can prevent buckling deformation and damage of the flexible printed circuit during reciprocal sliding of the first body and the second body, so as to extend life of usage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A sliding mechanism for connecting a first body and a second body of an electronic device, the sliding mechanism comprises:
    a first member fixed to the first body;
    a second member fixed to the second body, wherein the first member is movable with respect to the second member, and the second member comprises a second opening;
    a slider, being movable with respect to the second member and comprising a first opening;
    a wire, connecting the first member with the slider; and
    a flexible printed circuit (FPC), extended through the first opening of the slider and the second opening of the second member, wherein when the first member slides with respect to the second member along a first direction, the slider and the FPC are dragged by the wire along a second direction opposite to the first direction.

2. The sliding mechanism as claimed in claim 1, wherein the sliding mechanism further comprises an elastic element connecting the slider with the second member so that the wire is tensioned.

3. The sliding mechanism as claimed in claim 2, wherein the elastic element is a tension spring.

4. The sliding mechanism as claimed in claim 1, wherein the sliding mechanism further comprises a pulley disposed on the second member, and the wire is extended from the slider through the pulley to the first member.

5. The sliding mechanism as claimed in claim 1, wherein the slider and the first member are respectively disposed on a first side and a second side of the second member, and the FPC is extended from the first side through the first and second openings to the second side.

6. The sliding mechanism as claimed in claim 1, wherein the slider further comprises a main body and a first rod with the first opening formed therebetween, and the FPC forms a first bending portion on the first rod.

7. The sliding mechanism as claimed in claim 1, wherein the second member further comprises a second rod, and the FPC forms a second bending portion on the second rod.

8. The sliding mechanism as claimed in claim 1, wherein the FPC has an S-shaped cross-section.

9. The sliding mechanism as claimed in claim 1, wherein the first member comprises a third rod, and when the first member moves with respect to the second member, the FPC slides on the third rod.

10. An electronic device, comprising:
    a first body;
    a second body;
    a sliding mechanism, comprising:
        a first member fixed to the first body;
        a second member fixed to the second body, wherein the first member is movable with respect to the second member, and the second member comprises a second opening;
        a slider, being movable with respect to the second member and comprising a first opening;
        a wire, connecting the first member with the slider; and
        a flexible printed circuit (FPC), extended through the first opening of the slider and the second opening of the second member, wherein when the first member slides with respect to the second member along a first direction, the slider and the FPC are dragged by the wire along a second direction opposite to the first direction.

11. The electronic device as claimed in claim 10, wherein the sliding mechanism further comprises an elastic element connecting the slider with the second member so that the wire is tensioned.

12. The electronic device as claimed in claim 11, wherein the elastic element is a tension spring.

13. The electronic device as claimed in claim 10, wherein the sliding mechanism further comprises a pulley disposed on the second member, and the wire is extended from the slider through the pulley to the first member.

14. The electronic device as claimed in claim 10, wherein the slider and the first member are respectively disposed on a first side and a second side of the second member, and the FPC is extended from the first side through the first and second openings to the second side.

15. The electronic device as claimed in claim 10, wherein the slider further comprises a main body and a first rod with the first opening formed therebetween, and the FPC forms a first bending portion on the first rod.

16. The electronic device as claimed in claim 10, wherein the second member further comprises a second rod, and the FPC forms a second bending portion on the second rod.

17. The electronic device as claimed in claim 10, wherein the FPC has an S-shaped cross-section.

18. The electronic device as claimed in claim 10, wherein the first member comprises a third rod, and when the first member moves with respect to the second member, the FPC slides on the third rod.

* * * * *